United States Patent Office 3,448,279
Patented June 3, 1969

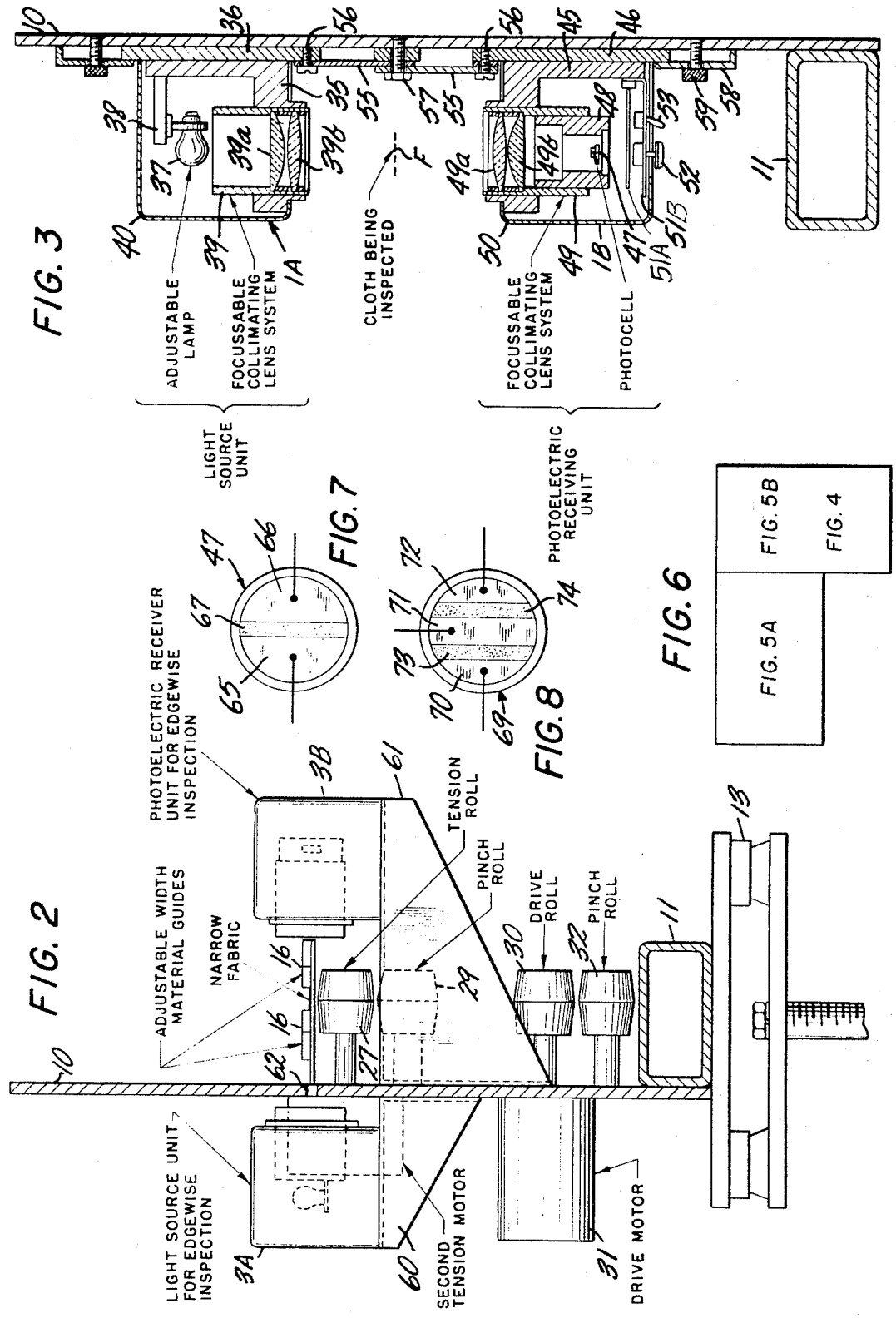

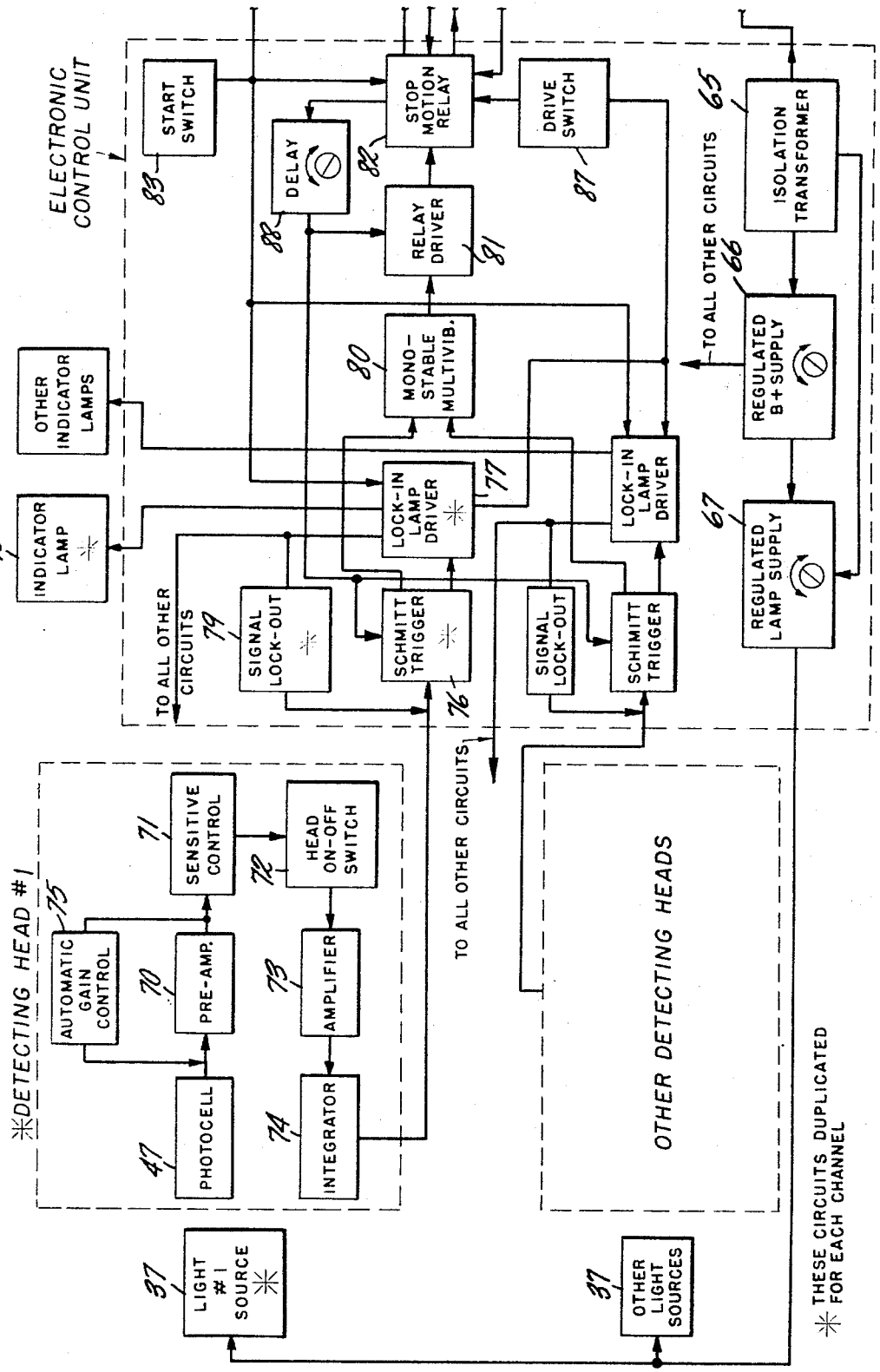

3,448,279
PHOTOELECTRIC DEFECT DETECTOR HAVING REFLECTION TEST TRANSMISSION TEST AND EDGEWISE TEST
Howard C. Lindemann, Westbury, and Willie A. Busch, New Rochelle, N.Y., assignors to Lindly & Company, Inc., Mineola, N.Y., a corporation of New York
Filed Oct. 17, 1966, Ser. No. 587,091
Int. Cl. G01n 21/30
U.S. Cl. 250—219
8 Claims

ABSTRACT OF THE DISCLOSURE

Narrow material such as tapes and ribbons is inspected as it moves between two pulleys by photoelectric units arranged to view both sides of the material and also to view the material edgewise in order to detect concurrently all defects which are likely to occur in the material. All of the photoelectric units are supplied from a common power source and their outputs are fed to a common logic circuit with individual lamps for indicating the nature of the defect.

---

The present invention relates to apparatus for inspecting narrow material. The term "Narrow Material" is used in a generic sense to include linear material such as ribbon, tape, bands, strips, braids, ropes, etc., having a narrow transversed dimension or width in proportion to its length. The apparatus is particularly useful for inspecting narrow fabrics such as tapes, ribbons, strips and bands, and is hence sometimes referred to as a narrow fabric inspector. However, it will be understood that this terminology is in no way intended to limit the apparatus as to the nature of the material on which it is used.

In the manufacture of narrow fabrics, produced for example by weaving or braiding, there are many defects that may occur. For example, there may be holes or thin places in the fabric, rough places or protuberances, spots on either face of the fabric, or uneven edges. It is difficult to detect all defects by personal inspection of the material optically. For example, a person cannot readily observe both faces of the fabric at the same time, and some defects, for example thin spots, are difficult to see. Moreover, personal inspection is expensive and is not reliable as it depends on the individual skill and constant attentiveness of the inspector.

It is an object of the invention to provide novel apparatus for inspecting narrow material rapidly, thoroughly, and economically, to detect all objectionable defects which occur in the material. The apparatus is highly flexible and adaptable so that it can be used to inspect different varieties of material and to detect defects of different kinds. Moreover, it not only signals and identifies each defect, but also performs other function as desired, for example counting the defects, stopping the feed of the material when a defect occurs, or marking the locality of a defect.

The objects and advantages of the invention will be more fully understood by the following description of a preferred embodiment of the apparatus, illustrated by way of example in the accompanying drawings in which:

FIG. 2 is a vertical cross section taken approximately on the line 2—2 in FIG. 1.

FIG. 3 is a schematic cross section taken approximately on the line 3—3 in FIG. 1, but with portions omitted.

FIGS. 5A and 5B are together a block circuit diagram.

FIG. 6 is a schematic view showing the inter-relation of the portions of the block diagram illustrated in FIGS. 5A and 5B.

FIG. 7 is a schematic view of a single element photo resistive unit, and

FIG. 8 is a schematic view of a dual photo resistive unit.

Figure 1:
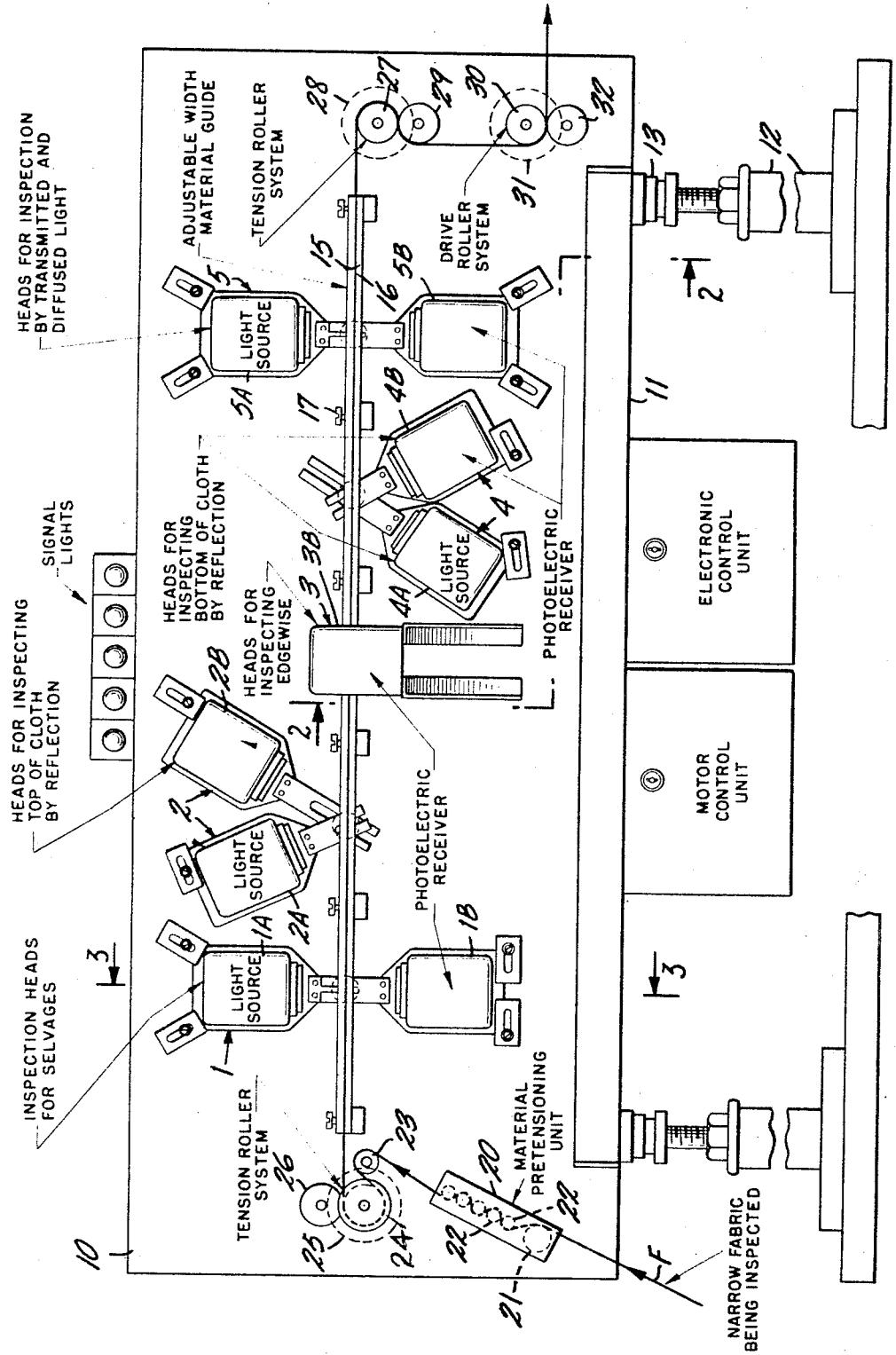
FIG. 1 is a schematic side elevation of apparatus in accordance with the invention.

The apparatus illustrated by way of example in the drawing comprises in general a transport system for the material to be inspected, a plurality of co-ordinated inspecting assemblies, electronic circuitry including control for the transport system and circuitry pertaining to the inspecting assemblies, and suitable support structure for the components of the apparatus.

In the apparatus illustrated by way of example in the drawings, there are five inspecting assemblies numbered 1 to 5 respectively, mounted on a suitable support. The number of inspecting assemblies can be varied according to the nature of the material being inspected and the kinds of objectionable defects that may occur in the material. There should ordinarily be at least three inspecting assemblies, and it is not usually necessary to have more than six.

The inspecting assemblies are mounted on a support structure comprising a rigid panel 10, supported by a rigid bed 11, mounted on adjustable floor stands 12, comprising means for vertical adjustment and shock absorbing units 13, to isolate the bed 11 and panel 10 from vibration.

The transport system for the material to be inspected comprises feed means for moving the material lengthwise, means for guiding the material along a predetermined path for inspection and means for maintaining the material under selected tension during inspection. The guiding means is shown as comprising a lower guide plate 15 mounted on and extending lengthwise of the panel 10, and side guides 16 at least one of which is adjustable laterally, for example by means of screws 17 extending through slots in the side guide and screwed into tapped holes in the guide plate 15. The material to be inspected is guided along a rectilinear path parallel to the support panel 10. The particular apparatus illustrated in the drawings is shown set up for inspection of flat strip material which, for convenience, is sometimes referred to as a tape, and is guided along a path parallel to the plate 10 with the plane of the material approximately perpendicular to the plane of the supporting plate 10. The guides 15 and 16 are provided with suitable cut-outs or apertures as required to permit inspection of the tape by the inspecting assemblies.

The fabric F which is to be inspected passes through a pretensioning unit 20, over an idler roller 23, around a tension roller 24, under a pinch roller 26, through the guide system comprising guides 15, 16, around a second tension roller 27 having an associate pinch roller 29, and around a drive roller 30 having an associated pinch roller 32. The pretensioning unit 20 is shown as comprising a roller 21 and a series of spaced parallel cylindrical bars 22 between which the fabric passes in a serpentine manner, so as to apply a selected drag to the fabric. The tension rollers 24 and 27 are mounted respectively on the shafts of the torque motors 25 and 28 to which current is supplied so as to provide torque in a counterclockwise direction to tension roller 24 and in a clockwise direction to tension roller 27, and thereby apply a selected tension to the portion of the tape extending between the two rollers 24 and 27, and guided by guides 15 and 16. The drive roller 30 is mounted on the shaft of a motor 31 for rotating the roller in a counter-clockwise direction and thereby pull the fabric F through the apparatus at a selected speed. The pretensioning unit 20, idler roller 23 and pinch rollers 26, 29 and 32 are all mounted on the support panel 10, the pinch rollers preferably being spring mounted or adjustable so as to be movable toward their associated rollers. The torque motors 25 and 28 and drive motor 30 are mounted on the back side of the support panel 10 with their shafts extending through holes to the forward side of the panel.

Each of the inspecting assemblies 1 to 5 comprises a transmitting unit providing a source of light rays or other radiation and a receiving unit for receiving the radiation as modified by the material being inspected. While the apparatus illustrated in the drawings uses visible light, it will be understood that ultraviolet light, infra-red light, or other radiation suitable for inspection of the material may be used. Typical transmitting and receiving units are illustrated somewhat schematically in FIG. 3. A transmitting unit 1A is shown as comprising a base 35 on a mounting plate 36 which extends beyond the base. An incandescent lamp 37 having a filament is adjustably mounted on the base 35 by a support 38. There is also mounted on the base 35 a focusable collimating lens system 39 shown as comprising lenses 39a and 39b. The unit is enclosed by a removable cover 40.

The receiving unit 1B is shown in FIG. 3 as comprising a base 45 on a supporting plate 46 which extends beyond the base. A photo cell 47 is supported in a suitable housing or casing 48. A focusable condensing lens system 49 is shown as comprising lenses 49a and 49b. The unit is enenclosed by a suitable cover 50. A circuit board 51A and panel board 51B are also mounted on the base 45 inside the cover and comprises certain components of the circuitry associated with the receiving unit. A sensitivity control knob 52 and toggle switch lever 53 are shown extending outside the cover 50.

At least certain of the inspecting units are mounted on the support panel 10 in such manner as to facilitate positioning the units with respect to the fabric being inspected. As illustrated in FIGS. 1 and 3 the mounting means comprises a bracket 55 one end of which is secured to the base plate 36, 46 of the unit while at the other end there is provided a hole receiving a pivot stud 57 and screwed into a tapped hole in the support panel 10. The unit is thereby pivotally mounted to swing about a pivot axis line substantially in the plane of the guided fabric being inspected. The unit is secured in selected pivoted position by one or more slotted clips 58 secured by a threaded stud 59 screwed into a tapped hole in the support plate. Of the units illustrated in the drawings, both units of inspecting assemblies 1, 2, 4 and 5 are mounted in the manner described. The transmitting unit 3A of the assembly 3 is mounted by a bracket 60 on the back of the supporting plate 10, while the receiving unit 3B is mounted on the front of the support plate 10 by a bracket 61. A hole 62 is provided in the support plate in line with the fabric that is to be inspected to permit the transmission of light from the transmitting unit 3A to the receiving unit 3B.

In the particular arrangement shown by way of example in the drawings, the first inspecting assembly is set up to inspect the selvedges of the fabric F. The light source and lens system of the transmitting unit 1A are adjusted to transmit a collimated beam of light towards the receiving unit 1B. The photo cell 47 of the receiving unit is preferably a single element photo resistive unit as illustrated in FIG. 7 having spaced electrodes 65 and 66 and a single intervening light sensitive element 67 the resistance of which varies in accordance with the light inpinging on it. The lens system of the receiving unit is adjusted to focus an image of the filament of the lamp 37 on the light sensitive element 67 of the photo cell 69. The light transmitted from the lamp to the photo cell will be partially blocked by the fabric being inspected. If there is a defect in either selvedge of the fabric, for example a projecting portion or a receding portion, the amount of light transmitted to the photo cell will change, so as to produce a signal. If an edge of the fabric is scalloped or picoted, a sufficiently long linear extent of the edge is viewed so that the individual scallops or picots average out and a signal is produced only when there is some deviation from the intended pattern. While the first inspecting assembly has been illustrated as inspecting both edges of the fabric simultaneously, an individual assembly, or alternatively an individual receiving unit, for each edge may be used if desired. In some instances it may be desirable to block out the central portion of the fabric between the selvedges by a suitable opaque shield, so that the receiving unit is affected only by defects in the edge or edges.

The second inspecting assembly 2 comprises a transmitting unit 2A like that described with reference to the first inspecting assembly and comprising a lamp and a lens system for directing light onto the fabric so as to illuminate the upper face of the fabric. It will be seen that the transmitting unit and the receiving unit are both disposed on the same side of the fabric with their optical axes disposed at an angle to fabric and to one another. Preferably the axes of the transmitting unit and the receiving unit are disposed at approximately equal angles to the fabric. The receiving unit 2B is preferably a dual element photo resistive unit having, as illustrated in FIG. 8, three conductive electrodes 70, 71 and 72 and two intervening photo sensitive elements 73 and 74 the resistance of which varies in accordance with the light impinging on the element. The lens system of the receiving unit 2B is adjusted so as to focus an image of the illuminated fabric onto the photocell 69, the photo sensitive elements 73 and 74 of which are disposed transversely to the direction of movement of the fabric. Hence, the image of any defect in the fabric—for example a dark spot—will inpinge on one of the photo sensitive elements while the other photo element is still viewing normal fabric. The resulting differential in the amount of light falling on the two photo sensitive elements produces a signal. Hence, the inspecting assembly 2 will detect any defects appearing on the upper face of the fabric.

The third inspecting assembly 3 is designed to provide an edgewise inspection of the fabric, and is essentially the same as the first inspecting assembly 1, except that the optical axis of the transmitting and receiving units is disposed approximately parallel to the fabric instead of being approximately perpendicular to the fabric as is the case with inspecting assembly 1. The term parallel is herein used to include a coincident relationship. As described above, and as seen in FIG. 2, the transmitting unit 3A is mounted back of the support panel 10 while the receiving unit 3B is mounted in front of the panel coaxially with the transmitting unit. A collimated beam of light is transmitted towards the fabric by the transmitting unit 3A, while the receiving unit focuses an image of the lamp filament on the single photo sensitive element of the photo cell of the receiving unit. Any deviation in thickness of the material will cause a variation in the amount of light received by the photo cell of the receiving unit and hence produces a signal. Thus, the inspecting assembly will detect any bumps or similar defects on either face of the fabric. It will also detect any stray strands or ends projecting from the plane of the fabric.

The fourth inspecting assembly 4 is the same as the second inspecting assembly 2, but is positioned on the opposite side of the fabric so as to view the lower face. As in the case of the second inspecting assembly, the photo cell of the receiver 4B preferably comprises a dual element photo resistive unit such as that illustrated in FIG. 8.

The fifth inspecting assembly 5 is essentially the same as the first inspecting assembly 1, and comprises a transmitting unit 5A disposed above the fabric and a receiving unit 5B coaxial with the transmitting unit and disposed below the fabric. As the fifth inspecting assembly is intended to detect any defects in the body of the fabric, the edge portions are preferably shielded by suitable opaque shields. The receiving unit 5B will thus produce a signal only when there is a defect such as a hole or a thin spot in the fabric. If the fabric normally has holes in it, as for example in the case of an open mesh fabric, a sufficient portion of the fabric is viewed by the receiving unit to average out normal openings, and produce a signal only in the event of abnormality.

While each inspecting assembly has been illustrated as comprising a transmitting unit and a receiving unit, it will be understood that in some instances it may be desirable to combine assemblies, for example by using a single light source for two or more receiving units. For example a second receiving unit similar to the receiving unit 1B can be provided in alignment with the transmitting unit 2A but on the opposite side of the fabric so that the transmitting unit 2A in conjunction with this additional receiving unit, carries out an inspection of one or both selvedges like inspecting assembly 1, or an inspection through the fabric like the fifth inspecting assembly 5, while the same transmitting unit 2A in conjunction with the receiving unit 2B on the same side of the fabric views one face of the fabric as described above. Similarly a receiving unit like unit 5B can be disposed in alignment with the transmitting unit 4A but on the opposite side of the fabric. With such an arrangement all of the functions presently carired out by the five inspecting assemblies illustrated in FIG. 1 could be performed by three inspecting assemblies, namely assemblies 2, 3 and 4 with the additional receiving units as described.

Figure 4:
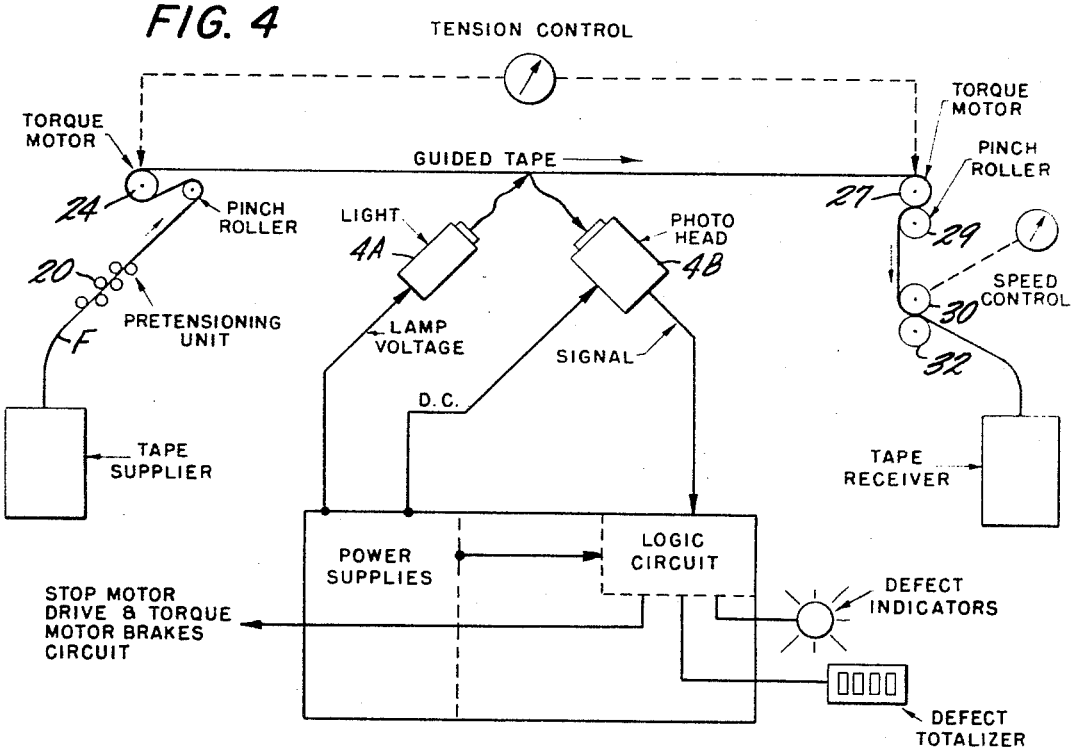
FIG. 4 is a simplified electromechanical block diagram illustrating only one of the inspecting assemblies.

The electrical circuitry of the apparatus is illustrated in a general manner in FIG. 4 in which, however, only one inspecting assembly is shown in order to simplify the drawing. It will be seen that means is provided for controlling the speed of the driving roller to control the speed of the tape and that there is a control for the torque motors of tension rollers 24 and 27 in order to control the tension of the tape during inspection. A common power supply provides power for the lamps of all of the transmitting units and also for all of the receiving units. Signals from the receiving units are fed to the logic circuit to which power is also supplied by the power supply. The logic circuit receives signals from the individual receiving units, and is provided with suitable outputs which are shown as defect indicators, a defect totalizer, and a stop motion circuit controlling the drive motor and mechanical brakes for stopping the tape.

Figure 5B:
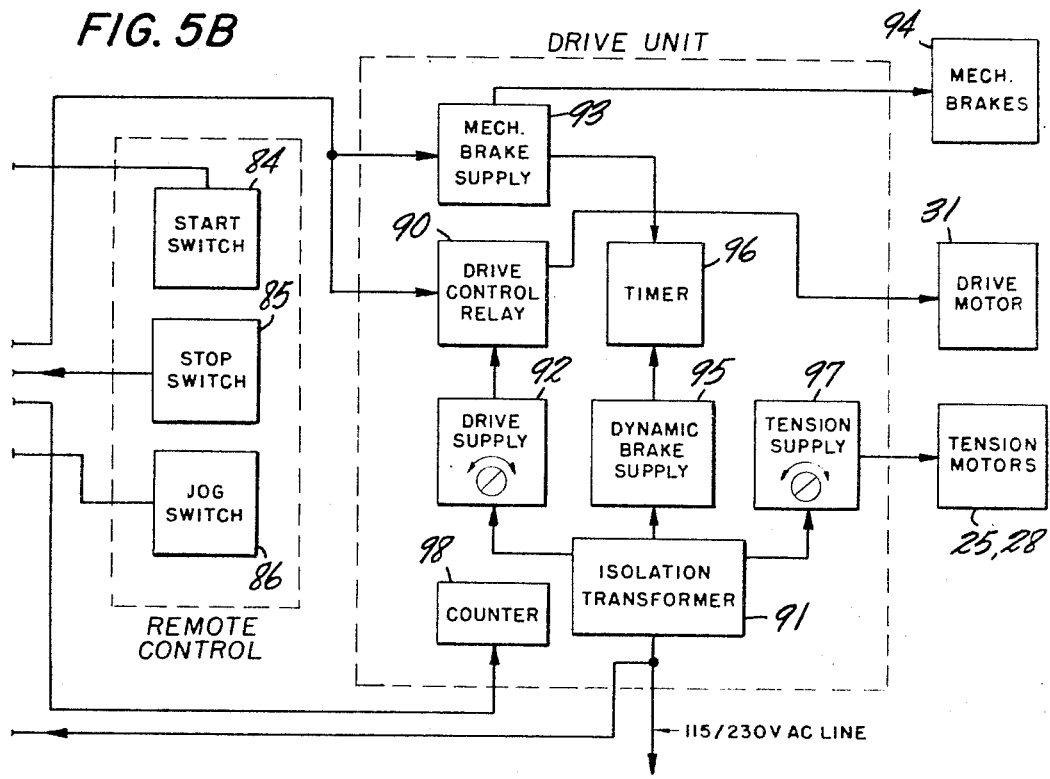

The circuitry is shown in more detail in FIGS. 5A and 5B. To simplify the block diagram, complete circuitry is shown for only one inspecting assembly with a notation that certain portions of the circuit are to be duplicated for each assembly and an indication as to how the light sources and detecting heads of other assemblies are to be connected.

The power supply of the apparatus comprises an isolation transformer 65 connected to an alternating current supply line and feeding a regulated B+ supply 66 for all circuits and a regulated lamp supply 67 connected to the lamps 37 of the transmitting units.

Each detecting head of the receiving unit comprises a photo cell, which has been identified as the photo cell 47 shown in FIG. 3, connected through a preamplifier 70, a sensitivity control 71, on/off switch 72 and amplifier 73 to an integrator 74. An automatic gain control 75 is connected back from the output to the input of the preamplifier 70. The sensitivity control 71 is adjustable manually by the knob 52 shown in FIG. 3 while the on/off switch 72 is operable by the switch lever 53, so that individual detecting heads can be adjusted and turned on and off as desired.

The integrator 74 of each detecting head is connected to a Schmitt trigger 76 an output of which is connected to a lock-in lamp driver 77. The lamp driver supplies power to an indicator lamp 78 one of which is provided for each inspecting assembly. The lamp driver is also connected to a signal lockout 79, the function of which is to lock out signals from all detecting heads, so that when the Schmitt trigger has been actuated by a signal from its respective detecting head, all other signals are locked out so that they cannot affect the circuit.

Outputs of all of the Schmitt triggers pertaining to the several detecting heads are connected to a monostable multivibrator 80, the output of which is connected to a relay driver 81, controlling a stop motion relay 82. The stop motion relay 82 is further subject to control by start switches 83 and 84, a stop switch 85, jog switch 86 and drive switch 87. The start switches are for starting the apparatus again, manually, after it has been stopped by the stop motion relay. An adjustable relay circuit 88 is connected back from the stop motion relay to the relay driver 81 and to the Schmitt triggers 76 in order to avoid, for a selected period of time, restopping of the apparatus by a signal from any of the detecting heads. This is desirable because during the start-up of the apparatus it is likely that spurious signals will occur. The stop switch 85 is for stopping the apparatus manually as desired. The jog switch 86 permits jogging the tape drive motor so as to move it forward by small increments, for example during testing or to move a defect out of the apparatus for removal of the apparatus. The drive switch 87 has three positions designated "normal," "off," and "test." When the drive switch is in normal position, the apparatus is set for normal operation. In off position of the switch, the transport system of the apparatus is turned off. In testing position of the drive switch, the motor and brake controlling contacts of the stop motion relay are bypassed so that the drive motor will continue to run despite the occurrence of defects. Connections from the drive switch 87 back to the lock-in lamp drivers 77 cause any lamp which has been lighted by the occurrence of a signal to turn off when the stop motion relay is actuated. With this connection, a signal from any detecting head causes the corresponding indicator lamp to blink momentarily, so as to indicate the presence of a defect but the transport system continues to run.

The stop motion relay 82 controls a drive control relay 90 to which power is supplied from an isolation transformer 91 through a drive supply 92 which is adjustable so as to control the speed of the drive motor. The drive control relay 90 is connected to the drive motor 31. The stop motion relay 82 also controls a mechanical brake supply 92 which supplies power to mechanical brakes 94 on the tension motors. During operation of the apparatus the brakes are energized to hold them in non-braking condition. On actuation of the stop motion relay, during normal operation, the occurrence of a signal causes the brakes to be de-energized and thereby applied to stop the motors. There is also provided a dynamic brake supply 95 for supplying power to the drive motor to assist in stopping it dynamically when the drive control relay 90 is actuated. The dynamic brake supply 95 is controlled by a timer 96 which is connected to the mechanical brake supply 93 so as to initiate a brake period when the mechanical brake supply is actuated to apply the brakes. After a selected period of time the dynamic brake supply is disconnected from the motor.

The transformer 91 also supplies power through an adjustable tension supply 97 to the tension motors 25 and 28. The tension supply 97 is adjustable so as to control the tension applied to the fabric during inspection.

An output of the stop motion relay 82 is also connected to a counter 98 which counts the number of stops of the apparatus by the stop motion relay. Other outputs may be provided as desired. For example the relay 82 may control a marking device for applying a mark on the tape to locate a defect.

While the operation of the apparatus will be apparent from the foregoing description, it will be summarized briefly. A signal from any detecting head actuates the corresponding Schmitt trigger 76, an output of which actuates the corresponding lock-in lamp driver 77 to turn on the corresponding indicator lamp 78. By reason of the lock-in characteristics of the lamp driver, the lamp remains on. At the same time the signal lock-out 79 locks out signals from all detecting heads so as to prevent other indicator lamps from being turned on by spurious signals occurring in other detecting heads as the fabric is slowed down and stopped by the stop motion control.

Actuation of any of the Schmitt triggers 76 results in actuation of the monostable multivibrator 80, relay driver 81 and stop motion relay 82. Through the connections that have been described, actuation of the stop motion relay 82 results in actuating the drive control relay 90 to stop the drive motor 31, applying mechanical brakes 94 to all motors through control of the mechanical brake supply 93 and energizing dynamic braking of the drive motor through the dynamic brake supply 95 for a selected period of time as controlled by the timer 96. The transport system of the apparatus is thereby stopped. While a signal from any of the detecting heads can actuate the stop motion, it will be noted that there is an individual indicator lamp for each head so that the operator will know what kind of a defect caused the stopping of the apparatus.

When the operator has taken such steps as may be appropriate with respect to the defect, he can again start the apparatus by pushing wither of the start switches 83 or 84. This starts the drive motor and releases the brakes. Through connections to the lock-in lamp drivers, it also turns off any indicator lamp which may have been lighted. During start-up of the apparatus spurious signals may occur and, to avoid stoppage of the apparatus by such signals, the delay 88 prevents actuation of the relay driver 81 and Schmitt triggers 76 for a selected and adjustable period of time during start-up.

From the foregoing description it will be seen that apparatus in accordance with the present invention provides for rapid and thorough inspection of narrow material to detect defects of different kinds, and to indicate which kind of defect is present. For example, if the indicator lamp corresponding to the first inspection assembly is lighted when the stop motion is actuated, it will indicate that there is a defect in the selvedge of the material. Hence, effective, thorough and economical inspection of strip materials is made possible.

While a preferred embodiment of the invention has been illustrated in the drawings and particularly described, it will be understood that the invention is in no way limited to this embodiment and that modifications may be made within the scope of the appended claims.

What we claim is:
1. Narrow material inspecting apparatus comprising transport means for moving lengthwise narrow material to be inspected while maintaining said material under selected tension and guiding said material to travel along a selected path; a plurality of inspection assemblies disposed along said path, and each comprising a radiation transmitting unit and a receiving unit, a first one of said assemblies comprising a transmitting unit and a receiving unit disposed on opposite sides of said material and having a common axis disposed in a first plane passing through said material path; a second one of said assemblies comprising a transmitting unit and a receiving unit disposed on opposite sides of said material path and having a common axis disposed in a second plane passing through said material path and at a substantial angle to said first plane; a third one of said assemblies comprising a transmitting unit and a receiving unit disposed on the same side of said material path and having axes disposed at an angle to one another in a plane passing through said material path, and a fourth one of said assemblies comprising a transmitting unit and a receiving unit disposed on the same side of said material path and having axes disposed at an angle to one another in a plane passing through said material path, said third and fourth assemblies being on different sides of said path; a common power supply for supplying power to all of said transmitting units; a common logic circuit; means connecting all of said receiving units to said common logic circuit, said common logic circuit including output means actuated upon a selected signal being received by any of said receiving units, and individual signal means for each of said receiving units to indicate which of said receiving units actuated said output means.

2. Apparatus according to claim 1 for inspecting flat material in which said first plane is perpendicular to the material and said second plane is parallel to the material.

3. Apparatus according to claim 2, in which said transmitting units of each of said first and second assemblies comprises a light source and means for providing a collimated beam of light directed toward the material.

4. Apparatus according to claim 3, in which said receiving units of each of said first and second assemblies comprises a single element photosensitive cell and means for focusing an image of said light source on said cell.

5. Apparatus according to claim 2, in which said third and fourth assemblies are on opposite sides of the material with their axes disposed in a plane approximately perpendicular to the material.

6. Apparatus according to claim 5, in which said transmitting unit of each of said third and fourth assemblies comprises a light source and means for directing light onto the material to illuminate the materials, and in which said receiving unit of each of said third and fourth assemblies comprises a dual element photosensitive cell and means for focusing an image of the illuminated material on said cell.

7. Apparatus according to claim 2, further comprising a fifth one of said assemblies having a transmitting unit and a receiving unit mounted on opposite sides of the material and directed at least one edge portion of the material and a receiving unit on the opposite side of the material to sense defects in at least one edge of the material.

8. Apparatus according to claim 1, including a rigid mounting panel parallel to said path of travel of the material and means for mounting said units in variable selected position on said panel.

References Cited

UNITED STATES PATENTS

| 2,458,926 | 1/1949 | Bassett | 250—219 |
| 3,041,461 | 6/1962 | Lindemann et al. | 250—219 |
| 3,340,400 | 9/1967 | Quittner | 250—219 |

RALPH G. NILSON, *Primary Examiner.*

MARTIN ABRAMSON, *Assistant Examiner.*